United States Patent [19]

Luthi

[11] Patent Number: 5,456,804
[45] Date of Patent: Oct. 10, 1995

[54] INLET SLICE ASSEMBLY, FOR A PULP SLURRY PROCESSING MACHINE

[75] Inventor: Oscar Luthi, Nashua, N.H.

[73] Assignee: Ingersoll-Rand Company, Woodcliffe Lake, N.J.

[21] Appl. No.: 293,615

[22] Filed: Aug. 22, 1994

[51] Int. Cl.[6] .................... D21F 1/02; B67D 5/00
[52] U.S. Cl. .................. 162/344; 162/336; 222/504; 222/544
[58] Field of Search .................. 162/336, 343, 162/344; 210/405, 456; 222/504, 544, 414, 310, 311, 367, 368

[56] References Cited

U.S. PATENT DOCUMENTS

| | | | |
|---|---|---|---|
| 3,788,557 | 1/1974 | Breunsbach | 239/401 |
| 4,128,455 | 12/1978 | Justus | 162/216 |
| 4,289,191 | 9/1981 | Myllymaki | 164/45 |
| 4,885,090 | 12/1989 | Chupka et al. | 210/497.01 |
| 4,941,950 | 7/1990 | Sanford | 162/343 |
| 5,104,011 | 4/1992 | Clarke-Pounder et al. | 222/504 |

Primary Examiner—W. Gary Jones
Assistant Examiner—Calvin Padgett
Attorney, Agent, or Firm—Robert F. Palermo; John Murphy

[57] ABSTRACT

A chamber having a slurry-admitting inlet at one end has a metering opening lengthwise thereof for feeding slurry to an associated slurry processing machine. A rotatable bar, having a plurality of spaced apart grooves formed therein, is disposed in immediate proximity to the metering opening to control slurry-flow through the opening. The grooves insure that access to the opening, by the slurry, will be greater than the largest floc diameter of the pulp at all operating conditions.

13 Claims, 2 Drawing Sheets

5,456,804

INLET SLICE ASSEMBLY, FOR A PULP SLURRY PROCESSING MACHINE

BACKGROUND OF THE INVENTION

This invention pertains, generally, to machines especially designed for the processing of pulp slurries, such as are used in paper-making, compaction baffle filters and twin roll presses being exemplary of such machines, and in particular to an inlet slice assembly for use with such machines.

Inlet slice assemblies are used to feed pulp slurry to compaction baffle filters and/or twin roll presses. They are employed to insure a uniform flow distribution over the total length of the subject machine. They have a metering opening for distributing slurry flow therethrough to the forming zone of the associated machine, the distribution being accomplished by the existence of a pressure differential of approximately five pounds per square inch between the inlet chamber of the inlet slice assembly and the forming zone of the associated machine. Means are provided for controlling the metering opening in response to the aforesaid pressure differential.

In addition, inlet slice assemblies deflocculate the stock, i.e., the pulp slurry. The slurry feed consistency is about two to eight percent. Pulp in this consistency forms flocs, i.e., small, spherical agglomerations of pulp. Flocs are undesirable for pulp washing because they will form an uneven mat with flow channels around the flocs, i.e., short circuiting of the wash water. In a twin roll press, the flocs are pressed into hard knits which are difficult to break up and dissolve. If undissolved, these hard knits will show up as undesirable "fish eyes" in the paper. The inlet slice assembly opening is widened periodically, e.g., every half hour or so, to clear any pulp or debris that might accumulate in the metering opening.

For normal operation, the metering opening of the slice assembly is approximately five to eight millimeters. At reduced tonnage and for smaller washer cylinder diameters, the opening is made even smaller. Floc size is approximately one and a half times the fiber length of the pulp. The average fiber length for softwood is about four millimeters. Thus, the floc size is about six millimeters in diameter.

The inlet slice assembly plugs almost immediately (within seconds) if the metering opening is smaller than the floc size. The aforesaid controlling means will compensate for the plugged slice assembly by making the metering opening larger. However, this defeats a principal purpose of the assembly, the effecting of a uniform flow across the full length of the machine, and will lead to plugging in the forming zone of the associated machine. The problem is worse for smaller cylinder diameters, such as in a twin roll press, because therein there is less flow per foot of roll length. It is also worse at reduced tonnage. Attempts to compensate for this have involved using a lower feed consistency at reduced tonnage to keep the flow high, but this results in more fines loss through the perforated drainage plates, and lower washing efficiency. The flow per foot is also lower for a slow-draining stock, but these stocks usually also have a shorter fiber length and smaller flocs.

The foregoing details the limitations known to exist in prior art. Thus, it is apparent that it would be advantageous to provide an alternative directed to overcoming one or more of the aforesaid limitations. Accordingly, a suitable alternative, embodied in a novel inlet slice assembly, is set forth herein, the same having features more fully disclosed hereinafter.

SUMMARY OF THE INVENTION

In one aspect of the present invention, the desired alternative is found in an inlet slice assembly, for a pulp slurry processing machine such as a compaction baffle filter or a twin roll press, comprising an elongate chamber; wherein said chamber has (a) a slurry-admitting inlet at one end thereof and (b) a metering opening, formed in said chamber lengthwise thereof and intermediate said ends thereof; and means confined within said chamber, and in immediate proximity to said opening, for controlling slurry-flow access to said opening; and said controlling means comprises a first plurality of separate means for relatively restricting slurry-flow access to said opening, and a second plurality of separate means for relatively accommodating slurry-flow access to said opening.

Further aspects of the invention, as well as the novel features thereof, will become apparent by reference to the following description, taken in conjunction with the accompanying figures.

DESCRIPTION OF THE PREFERRED EMBODIMENT

For a background understanding of the general purpose and functioning of an inlet slice assembly, reference is made to U.S. Pat. No. 5,104,011, issued on Apr. 14, 1992, to Ian H. Clarke-Pounder and Edward L. Farrar, for a Self-Cleaning Feed Apparatus, and to that end, the aforecited patent is incorporated herein by reference. In the referenced patent, an inlet slice assembly comprises an elongate chamber having a slurry-admitting inlet at one end thereof, a slurry-discharging outlet at the opposite end thereof, and a metering opening, formed in the chamber lengthwise thereof and intermediate the ends thereof. A rotatable bar, which is cut through a portion of its diameter to form a roughly semi-circular void segment for forming a throat in the inlet slice assembly, is confined in the chamber in immediate proximity to the metering opening. Too, hydraulic means are disclosed for rotating the bar to meter flow through the opening, and to dump the slice assembly.

Figure 1:
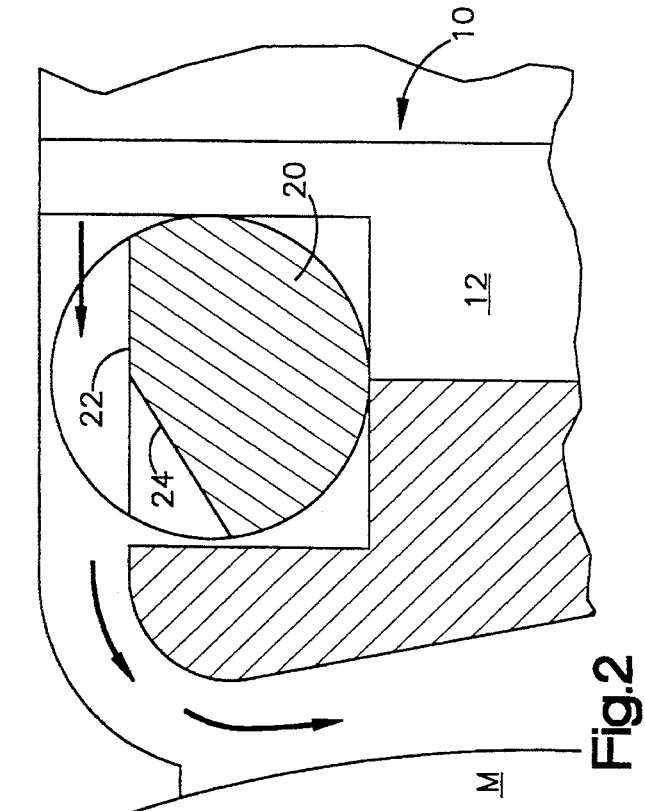
FIG. 1 is a fragmentary, cross-sectional view of an inlet slice assembly, according to an embodiment thereof, the same showing the assembly in a normal, operating disposition.
Figure 2:
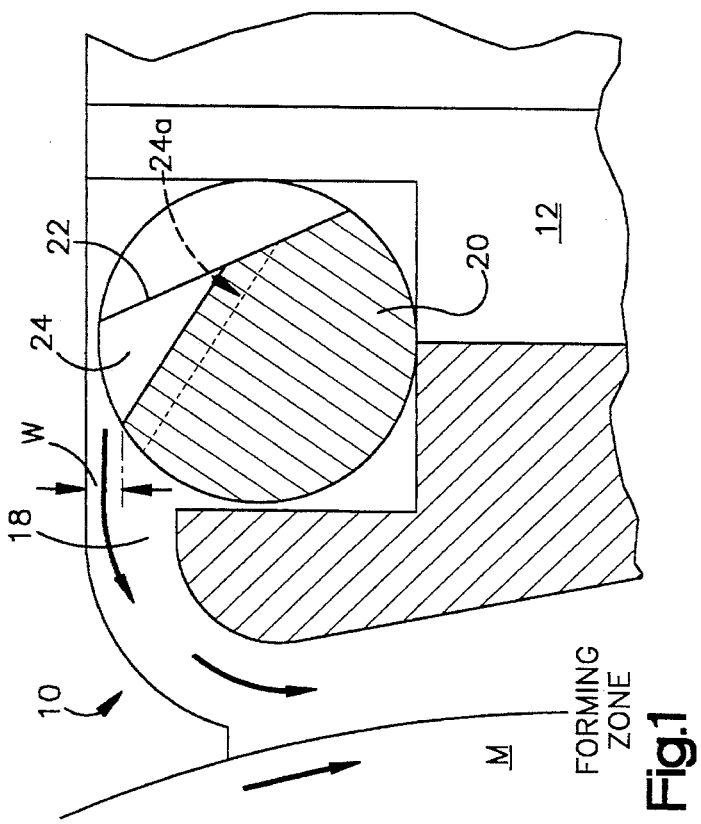
FIG. 2 is a view like that of FIG. 1 showing the assembly in a slice dump disposition.
Figure 3:
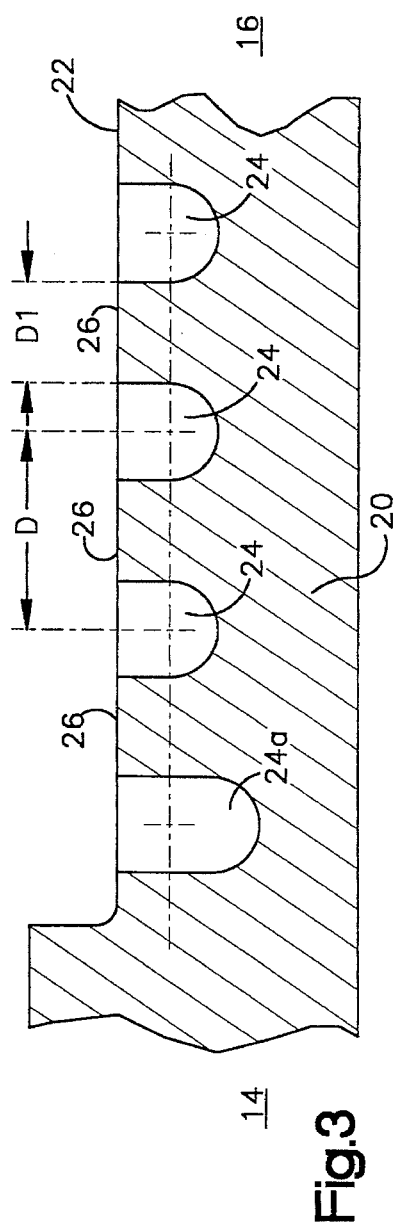
FIG. 3 is an axially cross-sectional view along a portion of the control bar.
Figure 4:
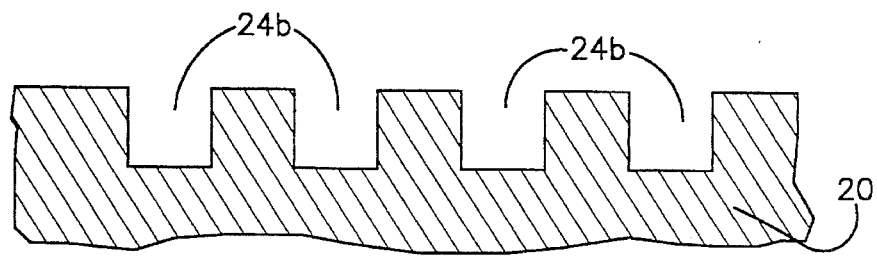
FIGS. 4 through 8 present alternate configurations of the grooves in the control bar.
Figure 5:
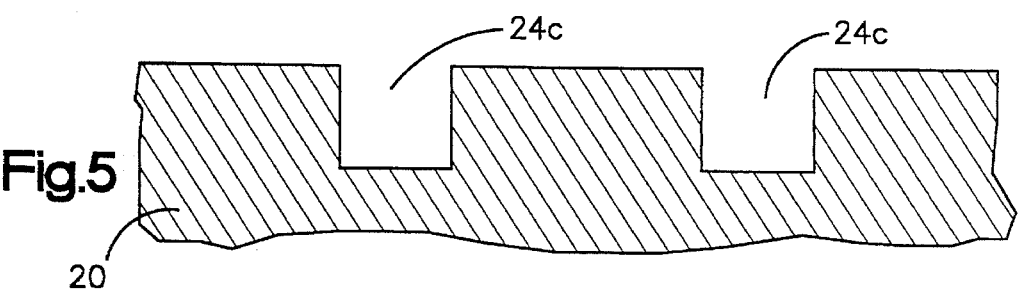
Figure 6:
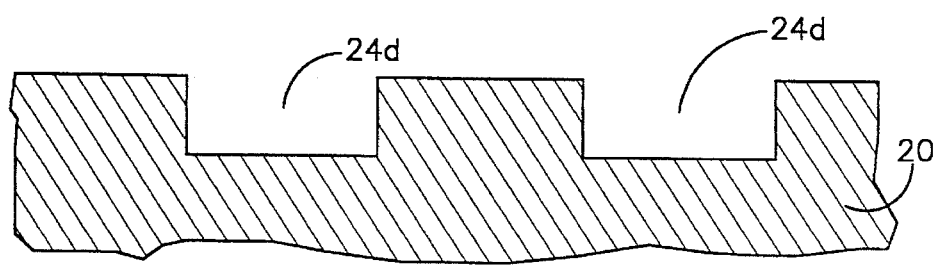
Figure 7:
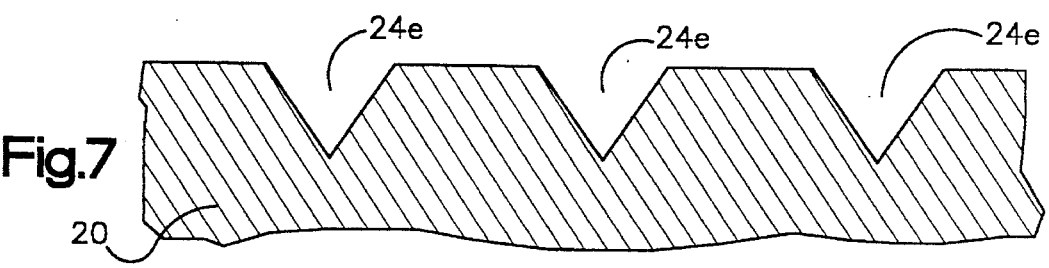
Figure 8:
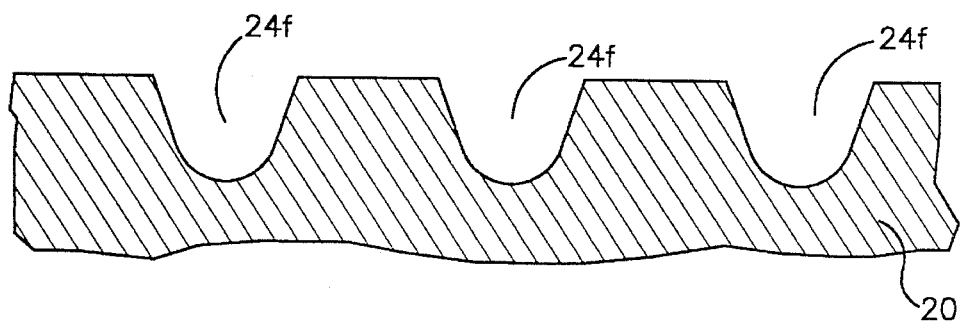

In the instant invention, as shown in FIGS. 1–3, the novel inlet slice assembly 10 also comprises an elongate chamber 12 having a slurry-admitting inlet 14 at one end thereof and may have an outlet 16 at the opposite end thereof, as well as a metering opening 18, formed in the chamber 12 lengthwise thereof and intermediate the ends thereof. A bar 20, rotatable within the chamber 12, in immediate proximity to the opening 18, is provided for controlling slurry-flow access to the opening 18.

The bar 20 has a flat relief 22 formed therein across a chord thereof intermediate the axial ends thereof. In addition, the bar 20 has a first plurality of substantially equally spaced apart grooves 24 formed therein, the grooves 24 being spaced apart by a plurality of lands 26. The grooves 24 are of diminishing depth, having a greatest depth where they open onto an outermost surface of the bar 20, and fair into the relief at the other ends thereof. As noted, the grooves are substantially equally spaced apart, a center of one of the grooves 24 is a dimension "D" apart from a center of another, next adjacent one of the grooves 24. The intervening lands 26 have a width "$D^1$" which is approximately half said dimension "D".

This inlet slice assembly 10 presents a minimum access to the opening 18 which is larger than the largest floc diameter of the pulp at all operating conditions, through the provisioning of the grooves 24. Instead of a uniform-width access to the opening 18, the assembly 10 offers a plurality of large, individual openings in the grooves 24.

It has been determined that the width "$D^1$" of the lands 26 should be the aforesaid half the dimension of the spacing "D" of the grooves 24, and the larger the land width the larger should be the minimum opening size.

The normal access width "W" shown in FIG. 1 will be approximately ten to eighteen millimeters, and as disclosed in the aforecited U.S. Pat. No. 5,104,011, such will be varied by the differential pressure between that obtaining in the chamber 12 and that in the forming zone of the associated machine "M", and the hydraulic means, or similar means, set out in the patent will rotate the bar 20 to adjust the width "W" accordingly. The assembly 10, of course, can still be opened widely, as shown in FIG. 2, to accommodate flushing thereof.

The forming zone of the associated machine "M" is more likely to plug at both ends thereof due to the fluid friction at the end wall. Accordingly, it is desirable to have deeper grooves 24a at ends of the bar 20 to get an increased flow at both ends. Accordingly, one of such grooves 24a is shown in FIGS. 1 and 3. Too, the invention is susceptible of practice with grooves of varying size and shapes, as shown in FIGS. 4 through 8 for grooves 24b through 24f.

While I have described the invention in connection with a specific embodiment thereof, it is to be clearly understood that this is done only by way of example and not as a limitation to the scope of the invention as set forth in the aspects thereof and in the appended claims.

What is claimed is:

1. An inlet slice assembly, for a pulp slurry processing machine comprising:

an elongate chamber having opposite ends; wherein said chamber has (a) a slurry-admitting inlet at one end thereof and (b) a metering opening, formed in said chamber lengthwise thereof and intermediate said ends thereof; and means confined within said chamber, and in immediate proximity to said opening, for controlling slurry-flow access to said opening; and said controlling means comprises a first plurality of separate means for relatively restricting slurry-flow access to said opening, and a second plurality of separate means for relatively accommodating slurry-flow access to said openings;

said controlling means comprises an elongate, generally round bar;

said first plurality of means comprises flat lands formed in said bar; and said second plurality of means comprises grooves formed in said bar.

2. An inlet slice assembly, according to claim 1, wherein:

each pair of said grooves has one of said lands therebetween.

3. An inlet slice assembly, according to claim 1, wherein:

each pair of said lands has one of said grooves therebetween.

4. An inlet slice assembly, according to claim 1, wherein:

each of said grooves is of diminishing depth.

5. An inlet slice assembly, according to claim 1, wherein:

each of said grooves is of uniformly diminishing depth.

6. An inlet slice assembly, according to claim 1, wherein:

said second plurality of means comprises a series of substantially equally spaced apart grooves formed in said bar;

an end one of said grooves of said series thereof has a depth and a length which are greater than the depth and length of the next adjacent groove thereto.

7. An inlet slice assembly, according to claim 1, wherein:

said grooves are substantially equally spaced apart, a center of one of said grooves being a given dimension apart from a center of another, next adjacent one of said grooves; and said lands each have a width which is approximately half said given dimension.

8. An inlet slice assembly, according to claim 1, wherein:

said grooves have arcuate terminations in said bar.

9. An inlet slice assembly, according to claim 1, wherein:

each of said grooves, in cross-section, is rectilinear.

10. An inlet slice, according to claim 1, wherein:

each of said grooves has diagonally disposed walls.

11. An inlet slice assembly, according to claim 1, wherein:

said controlling means can be turned to flush out pulp and debris.

12. An inlet slice assembly, according to claim 1, wherein:

intermediate ends thereof, said bar has a flat relief formed therein across a chord thereof; and said grooves are formed in said flat relief.

13. An inlet slice assembly, according to claim 12, wherein:

said metering opening has a given width; and said relief has a depth which corresponds, dimensionally, to said given width.

\* \* \* \* \*